(12) United States Patent
Brunswig et al.

(10) Patent No.: US 8,015,262 B2
(45) Date of Patent: Sep. 6, 2011

(54) STATELESS CORE SERVICE TRANSACTION PATTERNS

(75) Inventors: Frank Brunswig, Heidelberg (DE); Dinu R. Pavithran, Kerala (IN)

(73) Assignee: SAP, AG, Walldorf (DE)

( * ) Notice: Subject to any disclaimer, the term of this patent is extended or adjusted under 35 U.S.C. 154(b) by 227 days.

(21) Appl. No.: 12/038,766

(22) Filed: Feb. 27, 2008

(65) Prior Publication Data

US 2009/0216885 A1 Aug. 27, 2009

(51) Int. Cl.
*G06F 15/16* (2006.01)
*G06F 7/00* (2006.01)

(52) U.S. Cl. ......... 709/219; 709/201; 709/229; 707/609

(58) Field of Classification Search .................. 709/201, 709/219, 229
See application file for complete search history.

(56) References Cited

U.S. PATENT DOCUMENTS

| | | | | |
|---|---|---|---|---|
| 6,640,238 | B1* | 10/2003 | Bowman-Amuah | 709/201 |
| 7,191,290 | B1* | 3/2007 | Ackaouy et al. | 711/119 |
| 7,228,547 | B2* | 6/2007 | Yaung | 718/106 |
| 7,552,223 | B1* | 6/2009 | Ackaouy et al. | 709/229 |
| 2002/0178271 | A1* | 11/2002 | Graham et al. | 709/229 |
| 2007/0192444 | A1* | 8/2007 | Ackaouy et al. | 709/219 |
| 2008/0189438 | A1* | 8/2008 | Zimmerer et al. | 709/246 |

OTHER PUBLICATIONS

European Patent Office (EPO) Extended European Search Report (EESR) dated Jul. 2, 2009, issued in connection with counterpart application 09002875.4.

* cited by examiner

*Primary Examiner* — Asad M Nawaz
*Assistant Examiner* — Vitali Korobov
(74) *Attorney, Agent, or Firm* — Mintz, Levin, Cohn, Ferris & Glovsky and Popeo, P.C.

(57) ABSTRACT

A connection handler can receive a service request, initiate a temporary proxy state in the connection handler, open a first connection to a service provider from the connection handler to request fulfillment of the service request, and populate the temporary proxy state with a copy of original content received at the connection handler from the service provider in fulfillment of the service request. The populating can include creating a temporary proxy state content. The connection handler can tag the original content object on the service provider with an activity indicator that specifies that the original content has been accessed by the connection handler and then terminate the first connection between the connection handler and the service provider. Related systems, apparatus, methods, and/or articles are also described.

20 Claims, 3 Drawing Sheets

STATELESS CORE SERVICE TRANSACTION PATTERNS

FIELD

The subject matter described herein relates to patterns for stateless core service transactions.

BACKGROUND

Core service transactions may require the maintenance of a processing state in the process back end, such as for example an application server, an enterprise resource program, or the like, for a prolonged duration. A front end application, such as for example a client application that can run on a remote machine, can access the back end over a network or via a direct connection. Typically, one backend process is created for each connection to a client. Such connections can include, for example, an action, query, or process requiring an application call to the backend that is requested by the client machine either by user input or action of a locally running application can create a backend process. A state can, in some examples, be maintained on the back end for the entire duration of an interaction between a client and a back end server. When a series of changes are being made on one or more business objects during the interaction over a prolonged period of time, the back end state can be maintained for the duration of the interaction. Once the user has completed work on the object or objects, the changes can be saved, and the user interaction session can be terminated along with the connection between the back end server and the machine via which the user interacts with the back end. There can be cases where the user interaction is never terminated because of sporadic, unrelated user actions such as those associated with the use of object work lists (OWLs). In these cases, a state may never be built up on the back end.

SUMMARY

In one aspect, a connection handler receives a service request, initiates a temporary proxy state in the connection handler, opens a first connection to a service provider from the connection handler to request fulfillment of the service request, and populates the temporary proxy state with a copy of original content received at the connection handler from the service provider in fulfillment of the service request. The populating includes creating a temporary proxy state content. The connection handler tags the original content object on the service provider with an activity indicator that specifies that the original content has been accessed by the connection handler and terminates the first connection between the connection handler and the service provider.

In some variations one or more of the following can optionally be included. The connection handler can check a status of the original content on the service provider needed to fulfill the service request to verify that the original content is accessible. The original content can optionally be inaccessible if the original content already includes a locked service indicator. The connection handler can receive a command from the client machine from which the service request was received. The command can optionally be related to performing one or more actions on the temporary proxy state content. The connection handler can optionally execute the one or more actions on the temporary proxy state content. The connection handler can optionally open a second connection to the service provider, check the activity indicator on the original content against a record of user access, modify the original content to conform to the temporary proxy state content, update the activity indicator on the original content and terminate the second connection.

The service request can optionally be a query. The service provider can optionally include one or more databases that are queried, and the activity indicator can optionally be a flag that marks the original content in the one or more databases as "read only." The activity indicator can optionally include a time stamp that indicates when the original content was accessed. The connection handler can optionally include a generic client proxy, an interface, and a backend connection that communicates with the service provider. The interface can optionally be an object work list (OWL), and the proxy can optionally be a generic client proxy.

In an interrelated aspect, a system includes a memory that stores instructions in a machine readable language and a processor that access the memory and executes the instructions to implement a connection handler comprising an interface accessible by a client machine, a proxy, and a back end connection to a service provider; the interface receiving a service request form the client machine and initiating a temporary proxy state in the proxy, the back end connection opening a first connection to the service provider to request fulfillment of the service request and tagging one or more original content objects on the service provider with an activity indicator that specifies that the one or more original content objects has been accessed, the temporary proxy state in the proxy receiving a copy of the one or more original content object from the service provider via the back end connection and creating a temporary proxy state content by populating the temporary proxy state, the back end connection terminating the first connection between the connection handler and the service provider.

The back end connection can optionally open a second connection to the service provider. The proxy can optionally check the activity indicator on the one or more original content objects against a record of user access, modify the one or more original content objects to conform to the temporary proxy state content objects, and update the activity indicator on the original content. The back end connection can optionally terminate the second connection.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Various features of the subject matter described herein may provide advantages, possibly including but not limited to the following. A user can be allowed access to one or more services on a backend server over without requiring that an explicit connection be created for each access event. The services can be accessed as queries originated by the user or client computer. A user is able to make use of the results of a previous access even with intermittent periods of inactivity. Additionally or alternatively The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

The current subject matter can provide, among other possible advantages, methods, techniques, systems, apparatuses, and the like for conducting transactions between one or more client machines and one or more applications on a backend server. A stateless core service transaction pattern can be used in which a connection is maintained between a client machine and the backend server or servers for a short period of time necessary to perform a transaction. This can reduce the load on the backend server as it can avoid the need for multiple connections with client machines.

Figure 1:
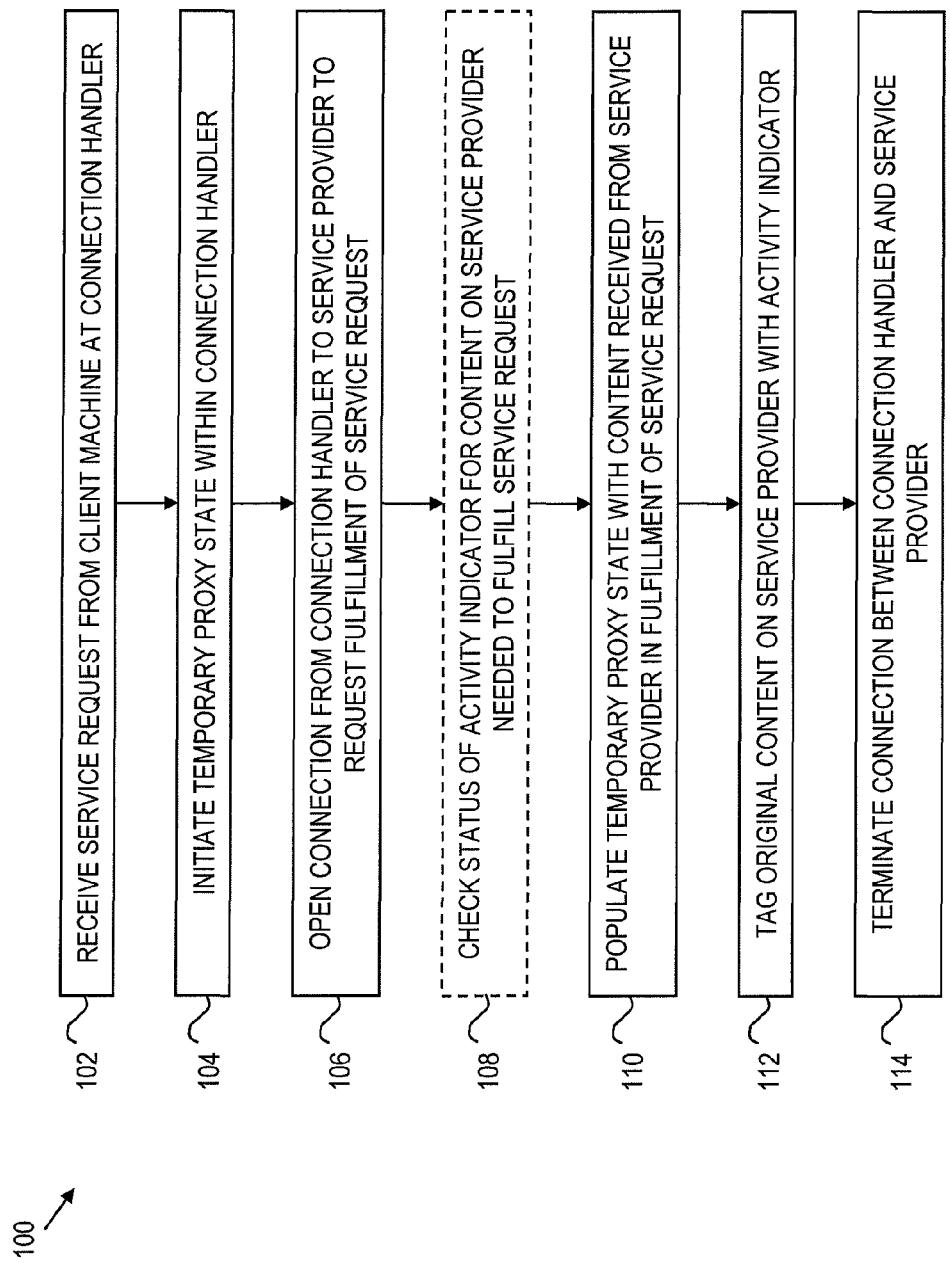
FIG. 1 is a process flow diagram illustrating a method for conducting transactions without maintaining a state on a back end machine.

In one implementation shown in the process flow diagram 100 of FIG. 1, a service request is received from a client machine at 102. The connection request can be a request for a service from a back end server or other service provider, such as for example a back end database, an enterprise resource server, a database, a Web service server, a portal server, or the like. The service requested can be made in a language such as for example WSDL, XML, SOAP, UDDI, or other languages that enable services from different systems to communicate with each other, and can be, among other options, a database query, a call to a back end application, selection by a user of a work task, such as for example by clicking on an item displayed on an interface such as an object work list OWL, or the like. At 104, a temporary proxy state is initiated, for example on a connection hander that can be implemented on a server, as an additional process on a back end server, on the client machine, or using some other processing resource. The temporary proxy state can be a process or other container capable of retrieving and holding the results of the requested service so that the client machine can access them independent of a continuing connection to the back end machine. At 106, the temporary proxy state opens a connection to the service provider to request fulfillment of the service request.

At 108, the connection handler can optionally verify the status of an activity indicator associated with the content on the service provider that is requested to fulfill the service request. Among other possibilities, the activity indicator can be, for example, a time stamp, a flag, a database entry, an entry in an access log, or the like, to mark the content as having been accessed and made available to a user for possible changes or additions. At 110 the temporary proxy state is populated with content from the serviced provider that can include one or more of information, data objects, application data, query results, or the like necessary to satisfy the service request. At 112, the original content on the service provider is tagged with an activity indicator, or alternatively, an existing activity indicator is updated, to reflect access of the content in request to the service request. At 114 the connection between the connection handler and the service provider is terminated.

Figure 2:
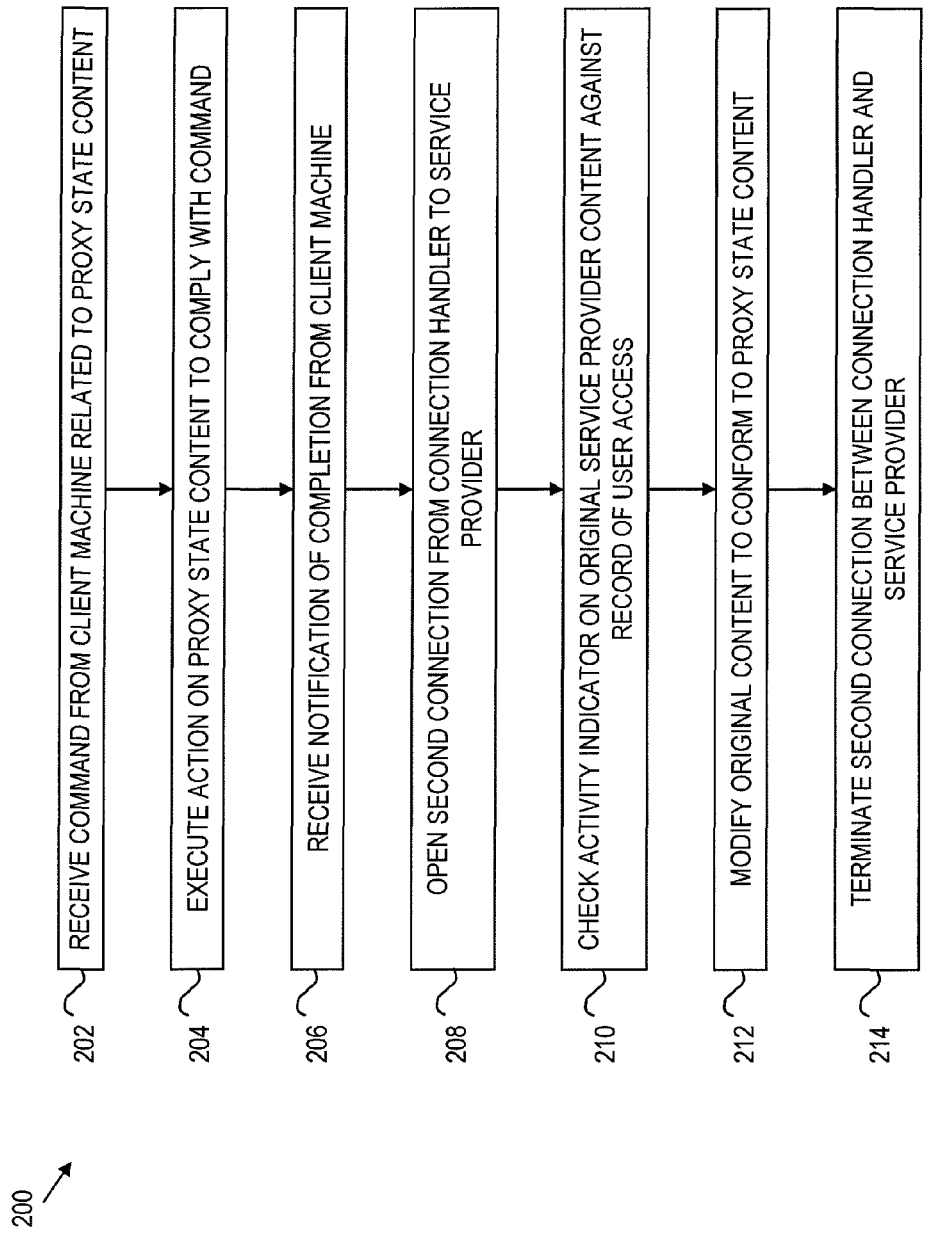
FIG. 2 is a process flow diagram illustrating additional optional actions that can be included in a method as shown in FIG. 1.

FIG. 2 shows additional actions in a method that could be used in series with the method illustrated in FIG. 1. FIG. 1 illustrates a process by which a temporary proxy state can be initiated on a connection handler and populated with content from a back end server. At 202 in FIG. 2, connection handler can receive a command from the client machine that is related to the content held in the proxy state based on the previously opened and closed connection as described above. The command can be any kind of action that might ordinarily be executed on the original content on the service provider if an open state were maintained between the client machine and the service provider. For example, if the original service request had been a database query and the user of the client machine is logged in with sufficient permissions to allow changes to the database objects retrieved in the query, the command could be a write or delete command related to one or more database objects retrieved by the query. The proxy state content can be operated on by executing on or more actions related to or in compliance with the received command at 204. More than one command can optionally be received and executed on the proxy state content during the duration of the temporary proxy state. If this occurs, actions 202 and 204 can be repeated as needed. Eventually, the user, optionally via the connection from the client machine, can complete the intended actions relating to the initial service request. The client machine can notify the connection handler of the service request completion, for example by providing a termination message, a logoff command, a shut down message from the client machine, a simple break in contact between the client machine and the connection handler, or other similar options. The connection handler can receive this notification at 206. In response, the connection handler can open a second connection to the service provider at 208. Via the opened second connection, at 210 the connection handler can check the activity indicator on the original service provider content against some record of user access. For example, the connection handler can maintain a record of a time stamp or activity indicator setting left on the service provider content during the originally opened connection. During the second connection, this record can be compared to the current activity indicator on the original content to verify if they match. If the activity indicator match occurs, the connection handler can pass information regarding actions, such as for example changes, deletions, additions, modifications, or the like that were made to the temporary proxy content and thereby effect these actions on the original content at 212. The second connection can then be terminated at 214. A revised activity indicator can optionally be added or changed to the original content to indicate the date, time, or other parameters regarding the actions performed on the original content. The temporary proxy state can then be terminated.

As noted above, upon opening the second connection session, the activity indicator is referenced to verify that the records have not been changed, such as for example via access by another client, during the interim between the first session and the second session. If the activity indicator does not match the record held on the connection handler, an exception report can be generated. In some variations, service requests that would call original content having an activity indicator specifying that the original content has been accessed and provided to a temporary proxy state can be denied until such time that the temporary proxy state has been terminated and the activity indicator changed to note that the original content is no longer potentially subject to change due to client machine interactions. Using the activity indicator, it is possible to prevent multiple overlapping user accesses and changes to a single data object without necessitating a continuously open state on the service provider.

Because connections are of short duration and no state is maintained on the server for a given client interaction, additional back end processing overhead associated with starting a back end state, or restarting a back end state that has timed out due to a period of inactivity from the client end, can be avoided. In one variation, the current subject matter can provide advantages in streamlining processes associated with an object work list (OWL) by allowing back-end servers that provide services called via the OWL to avoid maintaining a large number of potentially idle states corresponding to open tasks that are performed on data or objects that have been accessed and passed to the client where one or more changes can be made. This results in better management and performance or resources such as for example back end processor load and memory usage. Object work lists may be generated through a common user interface that can be provided on the connection handler so that users accessing the service provider or providers can encounter a familiar look and feel for each type of action or service request the user may generate.

The client proxy supports stateless paging of queries. The proxy creates a new connection for every user interaction that requires a backend.

The actions have as a parameter the last change time stamp.

Figure 3:
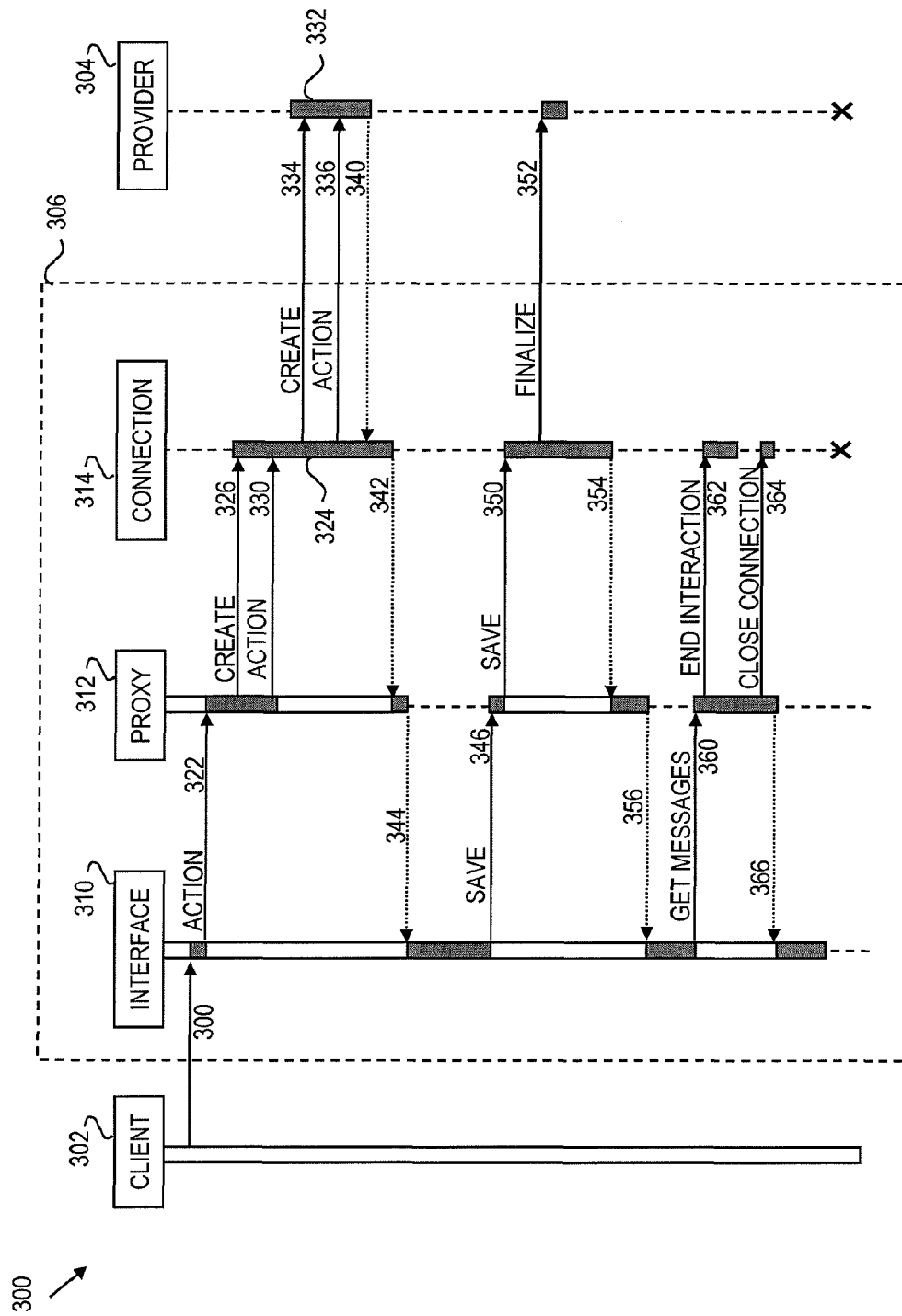
FIG. 3 is a communication tree diagram illustrating a system that can provider services from a service provider without establishing a persistent state on the service provider.

In another implementation shown in the communication tree diagram 300 of FIG. 3, a client computer 302 can access an application server or other service provider 304, which can be a backend server via a remote processing engine or other connection handler 306. The connection handler 306 can include a client interface or connector 310, which can in one variation be an object work list, a proxy 312, which can in some variations be a generic client proxy, and a backend connection 314 for communicating with the service provider 304. In operation, the client computer 302 can interface with the client interface 310 to initiate an action requiring a connection to an application on the service provider 304.

At 320, the client machine 302 initiates an interaction with the connection handler 306, for example by establishing a connection and launching a local client for the interface 310, which as noted above can be an OWL, or alternatively a Web service client, or some other user interface program capable of interacting with the interface 310 on the connection handler 306. At 320, a service or action request is initiated, for example by a user on the client machine 302 clicking on an item displayed in the local client by the interface 310. The proxy 312 creates or initiates a temporary proxy state 324 at 326 and passes the service or action request to the temporary proxy state 324 at 330. The backend connection 314 creates a connection with the service provider 304 at 334, and while the connection 332 is open passes the service or action request to the service provider 304 at 336. At 340 the connection handler 306 retrieves content from the service provider 304 and holds it in a temporary proxy state on the connection handler for use by the client machine 302. Also at 340, the connection handler sets or establishes an activity indicator associated to the original content on the service provider. This activity indicator can be as described above. In one example, it can be a time stamp indicating the time of access to the original content. The backend connection 314 relays the retrieved content to the proxy 312 at 342 which retains the content in a temporary proxy state that is accessible by the client 302 via the interface 310 at 344. By interacting with the content in this temporary proxy state, the client machine can execute one or more actions that are either related or unrelated to the action or service request.

At 346, the client machine 303, via the interface 310, can save one or more changes made to the temporary proxy content. The proxy 312 passes the save command to the backed connection 314 at 350. The backend connection 314 established a new connection at 352 to the service provider 304 that passes the changes so that the original content can be updated. The activity indicator set for the original content can be checked to verify that no other access has been allowed to the original content. Alternatively, the service provider 304 can disallow non-read only access to the original content to other client machines until the activity indicator is changed to reflect that the temporary proxy content has been synchronized with the original content on the service provider 304. The save message to the service provider 304 at 352 can also optionally include a finalize command that terminates the new connection and also releases the activity indicator so that the original content is no longer maintained in a restricted access state on the service provider 304. Confirmation of the finalize command is passed back to the proxy 312 at 354 and to the interface at 356. The client machine 302, via the interface 310, can complete the interaction and close out the temporary proxy state. At 360, the interface 310 can pass a "get messages" request to the proxy. The proxy can send an "end interaction" request to the back end connection 314 at 362 followed by a "close connection" request at 364. This terminates the temporary proxy state. Confirmation can be sent back to the interface at 366.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. An article comprising a machine-readable medium embodying instructions that when performed by one or more machines result in operations comprising:
    initiating a temporary proxy state in a connection handler upon receipt at the connection handler from a client machine of a service request for a service provided by a service provider connected to the connection handler by a backend connection, the connection handler being implemented on one or more processors, the temporary proxy state being specific to the client machine and to the service request;
    passing the service request from the connection handler to the temporary proxy state;
    opening a first connection over the backend connection to the service provider from the connection handler to request fulfillment of the service request;
    populating the temporary proxy state with a copy of original content received at the connection handler from the service provider via the first connection, the original content relating to fulfillment of the service request, the populating comprising creating a temporary proxy state content in the temporary proxy state;
    tagging the original content object on the service provider with an activity indicator that specifies that the original content has been accessed by the connection handler;
    terminating the first connection between the connection handler and the service provider;
    providing at the client machine access to the temporary proxy state content in the temporary proxy state subsequent to the termination of the first connection for fulfillment of the service request, including changing the temporary proxy state content after the first connection is closed and before another connection between the connection handler and the service provider is opened to enable modification of the original content at the service provider to conform to the changed temporary proxy state content; and
    in response to receiving a service request completion notification at the connection handler, opening the other connection to the service provider and passing information regarding the changing of the temporary proxy state via the other connection to modify the original content at the service provider to conform to the changed temporary proxy state content, the other connection configured to be terminated in response to a command to terminate the connection.

2. An article according to claim 1, wherein the instructions result in operations further comprising checking a status of the original content on the service provider needed to fulfill the service request to verify that the original content is accessible, the original content being inaccessible if the original content already includes a locked service indicator.

3. An article according to claim 1, wherein the instructions result in operations further comprising:
    receiving, at the connection handler, a command from the client machine from which the service request was received, the command being related to performing one or more actions on the temporary proxy state content; and
    executing the one or more actions on the temporary proxy state content.

4. An article according to claim 3, wherein the instructions result in operations further comprising:
    opening a second connection from the connection handler to the service provider;
    checking the activity indicator on the original content against a record of user access;
    modifying the original content to conform to the temporary proxy state content;
    updating the activity indicator on the original content; and
    terminating the second connection.

5. An article according to claim 1, wherein the instructions result in operations further comprising:
    opening a second connection from the connection handler to the service provider;
    checking the activity indicator on the original content against a record of user access;
    modifying the original content to conform to the temporary proxy state content;
    updating the activity indicator on the original content; and
    terminating the second connection.

6. An article according to claim 1, wherein the service request is a query, the service provider comprises one or more databases that are queried, and the activity indicator is a flag that marks the original content in the one or more databases as "read only."

7. An article according to claim 1, wherein the activity indicator comprises a time stamp that indicates when the original content was accessed.

8. An article according to claim 1, wherein the connection handler comprises a generic client proxy, and interface, and a backend connection that communicates with the service provider.

9. An article according to claim 8, wherein the interface is an object work list (OWL).

10. An article according to claim 8, wherein the proxy is a generic client proxy.

11. A computer-implemented method comprising:
  initiating a temporary proxy state in a connection handler upon receipt at the connection handler from a client machine of a service request for a service provided by a service provider connected to the connection handler by a backend connection, the connection handler being implemented on one or more processors, the temporary proxy state being specific to the client machine and to the service request;
  passing the service request from the connection handler to the temporary proxy state;
  opening a first connection over the backend connection to the service provider from the connection handler to request fulfillment of the service request;
  populating the temporary proxy state with a copy of original content received at the connection handler from the service provider via the first connection, the original content relating to fulfillment of the service request, the populating comprising creating a temporary proxy state content in the temporary proxy state;
  tagging the original content object on the service provider with an activity indicator that specifies that the original content has been accessed by the connection handler;
  terminating the first connection between the connection handler and the service provider;
  providing at the client machine access to the temporary proxy state content in the temporary proxy state subsequent to the termination of the first connection for fulfillment of the service request, including changing the temporary proxy state content after the first connection is closed and before another connection between the connection handler and the service provider is opened to enable modification of the original content at the service provider to conform to the changed temporary proxy state content; and
  in response to receiving a service request completion notification at the connection handler, opening the other connection to the service provider and passing information regarding the changing of the temporary proxy state via the other connection to modify the original content at the service provider to conform to the changed temporary proxy state content, the other connection configured to be terminated in response to a command to terminate the connection.

12. A method according to claim 11, further comprising checking a status of the original content on the service provider needed to fulfill the service request to verify that the original content is accessible, the original content being inaccessible if the original content already includes a locked service indicator.

13. A method according to claim 11, further comprising:
  receiving, at the connection handler, a command from the client machine from which the service request was received, the command being related to performing one or more actions on the temporary proxy state content; and
  executing the one or more actions on the temporary proxy state content.

14. A method according to claim 13, further comprising:
  opening a second connection from the connection handler to the service provider;
  checking the activity indicator on the original content against a record of user access;
  modifying the original content to conform to the temporary proxy state content;
  updating the activity indicator on the original content; and
  terminating the second connection.

15. A method according to claim 11, wherein the service request is a query, the service provider comprises one or more databases that are queried, and the activity indicator is a flag that marks the original content in the one or more databases as "read only."

16. A method according to claim 11, wherein the activity indicator comprises a time stamp that indicates when the original content was accessed.

17. A method according to claim 11, wherein the connection handler comprises a generic client proxy, and interface, and a backend connection that communicates with the service provider.

18. A system comprising:
  a memory that stores instructions in a machine readable language; and
  one or more processors that access the memory and execute the instructions to implement a connection handler comprising an interface accessible by a client machine, a proxy, and a back end connection to a service provider;
  the connection handler performing operations comprising:
initiating a temporary proxy state upon receipt at the connection handler from the client machine of a service request for a service provided by the service provider, the temporary proxy state being specific to the client machine and to the service request;
  passing the service request to the temporary proxy state;
  opening a first connection over the backend connection to the service provider from the connection handler to request fulfillment of the service request;
  populating the temporary proxy state with a copy of original content received at the connection handler from the service provider via the first connection, the original content relating to fulfillment of the service request, the populating comprising creating a temporary proxy state content in the temporary proxy state;
  tagging the original content object on the service provider with an activity indicator that specifies that the original content has been accessed by the connection handler;
  terminating the first connection between the connection handler and the service provider;
  providing at the client machine access to the temporary proxy state content in the temporary proxy state subsequent to the termination of the first connection for fulfillment of the service request, including changing the temporary proxy state content after the first connection is closed and before another connection between the connection handler and the service provider is opened to enable modification of the original content at the service provider to conform to the changed temporary proxy state content; and
  in response to receiving a service request completion notification at the connection handler, opening the other connection to the service provider and passing information regarding the changing of the temporary proxy state via the other connection to modify the original content at the service provider to conform to the changed temporary proxy state content, the other connection configured to be terminated in response to a command to terminate the connection.

19. A system according to claim 18, wherein the operations further comprise:
  opening a second connection to the service provider over the backend connection;
  checking the activity indicator on the one or more original content objects against a record of user access;

modifying the one or more original content objects to conform to the temporary proxy state content objects;

updating the activity indicator on the original content; and terminating the second connection.

20. A system according to claim 18, wherein the interface is an object work list (OWL) and the proxy is a generic client proxy.

* * * * *